March 18, 1952  J. L. SCHETKY  2,589,872
TAIL GATE CONTROL FOR DUMP TRUCKS
Filed March 23, 1948  2 SHEETS—SHEET 1

INVENTOR.
John L. Schetky
BY
Atty.

March 18, 1952
J. L. SCHETKY
2,589,872
TAIL GATE CONTROL FOR DUMP TRUCKS
Filed March 23, 1948
2 SHEETS—SHEET 2
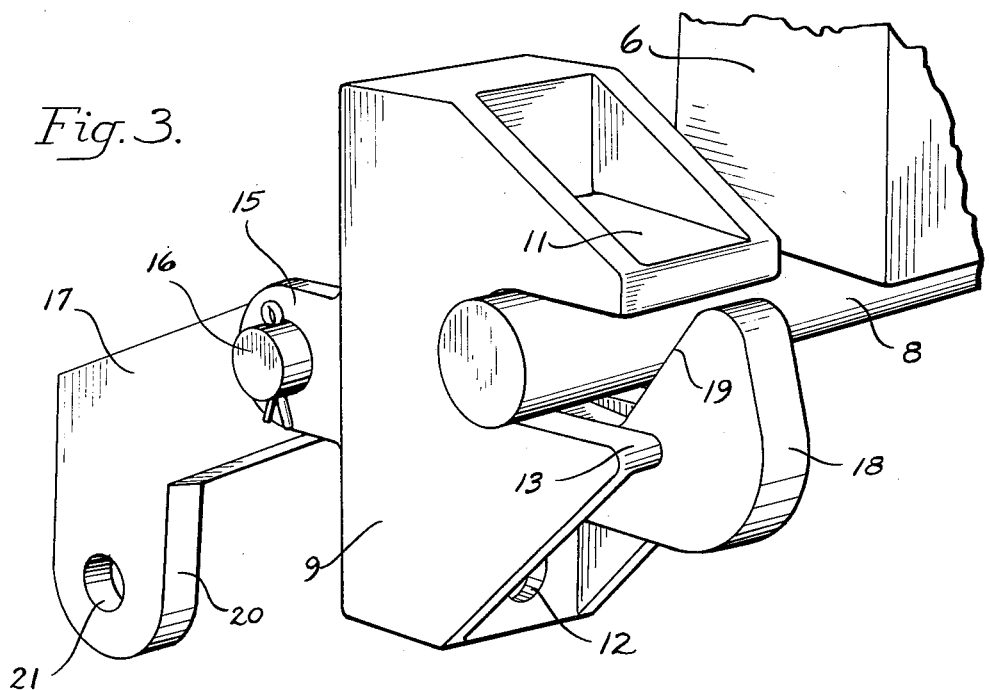
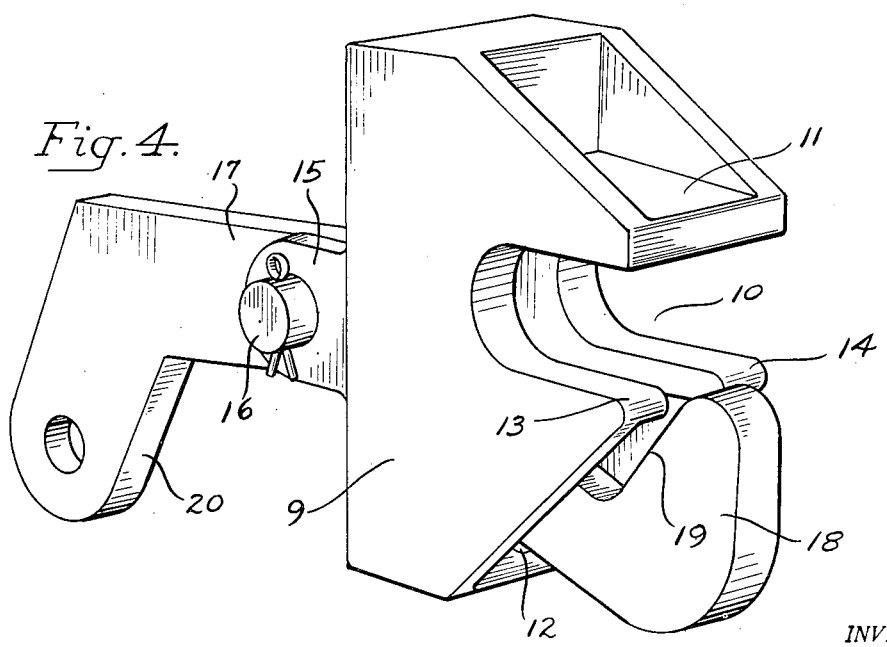
INVENTOR.
John L. Schetky
BY
Atty.

Patented Mar. 18, 1952

2,589,872

UNITED STATES PATENT OFFICE 2,589,872

TAIL GATE CONTROL FOR DUMP TRUCKS

John L. Schetky, Portland, Oreg., assignor to Roots & Schetky Inc., Portland, Oreg., a corporation of Oregon Application March 23, 1948, Serial No. 16,493

4 Claims. (Cl. 298—23)

This invention pertains to tailgate controls for trucks, and relates particularly to a novel mechanism for controlling the locking and unlocking of tailgates on dump trucks.

A principal object of the present invention is to provide latch means for the tailgates of dump trucks, said means being shielded from solid material falling from said dump truck to prevent jamming or injury of the operating parts.

Another object of the invention is to provide a novel latch construction by means of which wear of the engaging members is minimized.

A further object of the invention is to provide a tail-gate latch control for dump trucks wherein adjustment may be made to accommodate varying degrees of overlap between the engaging parts of the latch and gate, and to provide for ready alignment of the control mechanism with respect to the pivot axis of the dump body.

These and other objects and advantages will appear from the following detailed description taken in connection with the accompanying drawings, in which:

Fig. 3 is a perspective view of the latching device in closed, or locking, position; and Fig. 4 is a perspective view of the latching device in open, or released, position.

Figure 1:
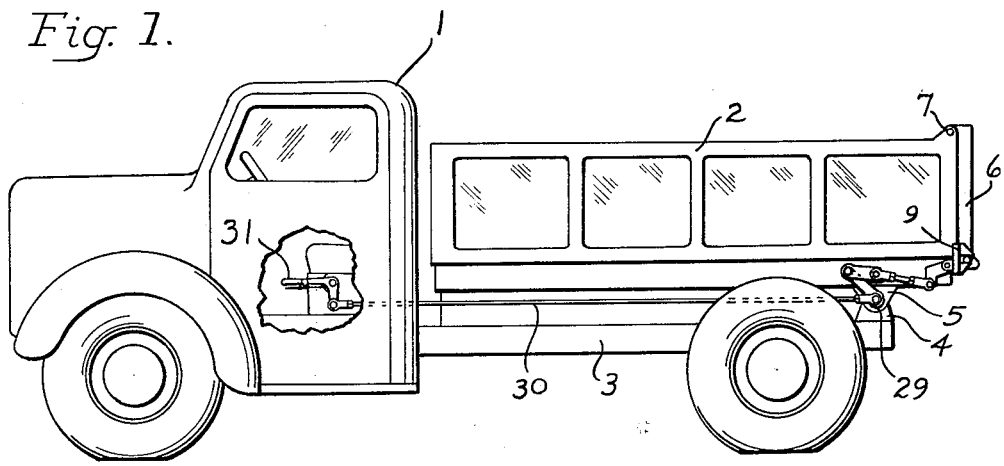
Fig. 1 is a perspective view of a dump truck upon which is installed the device of the present invention.

A conventional type of truck 1 having a dump body 2 is shown mounted on the chassis frame 3 for rotation about a transverse axle pivotally joining the chassis and dump body through flanges 4 and 5, respectively, in well-known manner. The tailgate 6 is pivotally secured at 7 to the rear end of the dump body, thus permitting the gate to swing open from its lower end as the dump body is tilted. Extending laterally from the lower end of the tailgate is a locking pin 8 adapted to be received by the latching mechanism of the present invention by means of which the operation of the tailgate is regulated, as will now be described. It is to be understood that, although in the present discussion the mechanism is shown installed upon one side of the truck only, a similar system may be provided for the opposite side, by mere duplication.

The latch of the present invention comprises a head piece 9 secured, as by welding, to the dump body 2 adjacent the lower end of the tailgate. A slot 10 extends transversely across the rear of said head and receives the locking pin 8 secured to the lower end of the tailgate. The transverse slot 10 defines an imperforate shield 11 thereover by means of which dirt or other material is prevented from lodging in or otherwise jamming the engaging parts of the mechanism. A second slot 12 extending centrally and longitudinally through the head below the shield 11 forms projecting fingers 13—14 below the transverse slot on which the locking pin 8 is guided.

Extending forwardly of the head piece and disposed adjacent the longitudinal slot 12 are flanges 15 provided with aligned holes adapted to receive the pin 16 about which the latch bar 17 pivots in response to manipulation of the control system later to be described. The rear end of the latch bar 17 pivoted intermediate its ends about the pin 16 moves between the fingers 13—14 in the longitudinal slot 12, and is provided at its extreme end with an upturned head 18 by means of which the locking pin 8 is releasably retained in the transverse slot 10. The pin engaging face 19 of said head slopes outwardly toward the top thereof, thus accommodating wear of the parts.

The forward end of the latch bar 17 is offset, as at 20, and provided with a hole 21 for receiving pin 22 by means of which one end of the adjustable link 23 is pivotally secured thereto. This link is made longitudinally adjustable by such means as a turnbuckle connection 24. Such adjustability permits changing of the degree to which the latch head 18 overlies the locking pin 8, and provides for aligning the control device with respect to the axle of the dump body, as explained more fully hereinafter. The forward end of the link 23 is pivotally secured at 25 to one arm 26 of a bell crank which in turn is pivoted about an axle 27 secured to the side frame of the dump body 2. The second arm 28 of the bell crank is pivoted at its free end 29 to the control rod 30 leading to a hand lever 31 or other appropriate control device preferably but not necessarily located within the cab of the truck. Additionally, an L-shaped stop or bumper 26a or the equivalent may be provided as means to limit the amount of travel above dead center (see the dead center line 32 in Fig. 2) of the pivotal connection 25.

Figure 2:
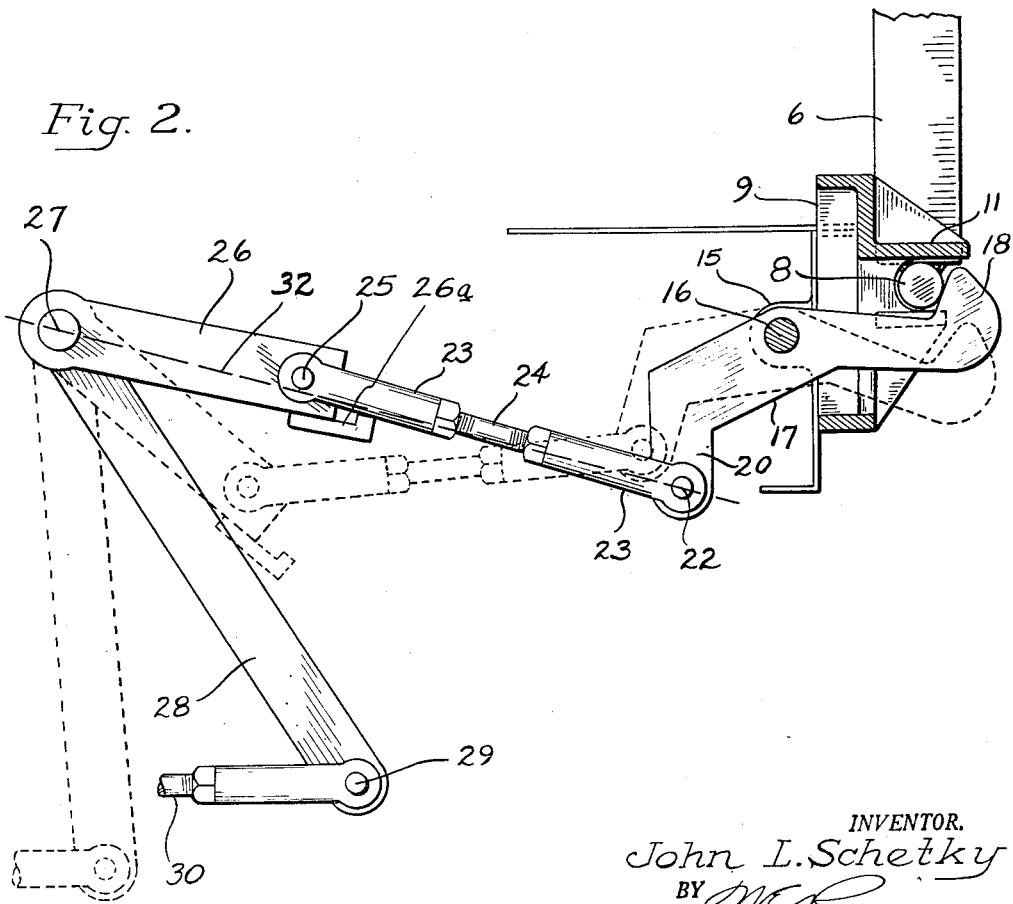
Fig. 2 is a side view, partially in section, showing the features of a device embodying my invention and illustrating the manner in which the same operates.

It is to be noted that when the latch bar 17 is in the position shown in Figs. 1 to 3 of the drawings, i. e. when the latch head 18 is raised between the fingers 13, 14 and therefore capable of retaining the locking pin 8 of the tailgate within the transverse slot 10, the free end 29 of the bell crank arm 28 is in axial alignment with the axle mounted in flanges 4 and 5 about which axle the dump body 2 is pivoted. In the installation of the device of the present invention on trucks of diverse design, the precise alignment of the pivot point 29 with the axle of the dump body may be achieved by adjustment of the link 23. In this closed, or locked, position of the latch the dump body may be freely pivoted about its axle without causing the position of the latch to change. This is for the reason that the elements of the latch system disposed rearwardly of the pivot point 29 rotate about that point, as does the dump body, without changing the relative positions of any of these elements with respect to the others. Similarly, therefore, the latch mechanism may be actuated to release the locking pin 8 regardless of the position of the dump body relative to the chassis of the truck.

The operation of the device of the present invention, assuming an initial state as illustrated in Fig. 1 of the drawings, is as follows: The dump body 2 is raised, if desired, to any selected position, and the operator then manipulates the lever 31, causing the control rod 30 to pull the bell crank arms 28 and 26 to the position shown in dotted lines in Fig. 2. The end 25 of the adjustable link 23 is thereby forced downwardly and forwardly breaking below the dead center line 32 extended between the centers 22—27. The forward movement of the end 25 of the link produces a similar movement of the rear end 22 of the link. This results in the pivoting of latch bar 17 about the pin 16 in an upwardly direction at end 20 and downwardly at the head end 18, thereby releasing the locking pin 8, as is shown in Fig. 2 in dotted lines.

In the reverse operation of the device, the dump body is preferably first lowered onto the truck chassis, whereupon the tailgate 6 swings forward to engage its locking pin within the transverse slot 10. The operator then manipulates the control lever 31 in such manner as will cause the rod 30 to push rearwardly upon the bell crank arm at the pivot point 29. The pivot point 25 between the bell crank arm 26 and the link 23 is thus caused to be raised rearwardly, breaking upwardly past the dead-center line 32, to lock the parts in the position shown in full lines in Fig. 2. Simultaneously, the rear end 22 of the link is lowered rearwardly, pivoting the latch bar into closed position and locking the gate pin 8 within the transverse latch slot.

I claim:

1. A tailgate control for dump trucks, comprising a head piece, a transverse slot in said head piece for receiving a tailgate locking pin and defining an imperforate shield thereover, a longitudinal slot in said head piece, a latch bar pivotally secured in said longitudinal slot, a latch head on one end of the latch bar for releasably locking the tailgate pin in said transverse slot, said imperforate shield extending rearwardly over the tailgate pin-engaging surface of said latch head sufficiently to shield said parts from debris and thereby to prevent jamming of said mechanism, a link pivotally joining the opposite offset end of said latch bar to one arm of a bell crank, control means pivotally connecting the other arm of said bell crank to an actuating lever, the pivotal connection of said link and bell crank arm lying intermediate the pivotal connection of the link and offset end of the latch bar and the pivotal support of the bell crank, respectively, being positioned above a dead center line extending between said latter pivotal connections to lock the latch head in locking position, and means for limiting the amount of travel above the dead center line of said link and bell crank arm pivotal connection.

2. A tailgate control for dump trucks, comprising in combination with a truck chassis, a dump body pivoted thereto and a tailgate on said dump body; a head piece secured to the dump body adjacent said tailgate, a transverse slot in said head piece for receiving a tailgate locking pin, a longitudinal slot in said head piece defining projecting fingers lying below said transverse slot, a latch bar pivotally secured in said longitudinal slot, a latch head on one end of said latch bar for releasably locking the tailgate pin in said transverse slot, an adjustable link pivotally joining the opposite offset end of said latch bar to one arm of a bell crank pivoted to the dump body, a control rod pivotally connecting the other arm of said bell crank to an actuating lever, the pivotal connection of said link and bell crank arm lying intermediate the pivotal connection of the link and offset end of the latch bar and the pivotal support of the bell crank, respectively, being positioned above a dead center line extending between said latter pivotal connections, to lock the latch head in locking position, and means for limiting the amount of travel above the dead center line of said link and bell crank arm pivotal connection.

3. A tailgate control for dump trucks comprising, a head piece, a transverse slot in said head piece for receiving a tailgate locking pin, a central longitudinal slot in said head piece defining projecting fingers lying below said transverse slot, a latch bar pivotally secured intermediate its ends in said longitudinal slot, a latch head on one end of the latch bar operating between said fingers for releasably locking the tailgate pin in said transverse slot, a longitudinally adjustable link pivotally joining the opposite offset end of said latch bar to one arm of a bell crank, the pivotal connection of said link and bell crank arm lying intermediate the pivotal connection of the link and offset end of the latch bar and the pivotal support of the bell crank, respectively, being positioned above a dead center line extending between said latter pivotal connections to lock the latch head in locking position, and means for limiting the amount of travel above the dead center line of said link and bell crank arm pivotal connection.

4. A tailgate control for dump trucks comprising, a head piece, a transverse slot in said head piece for receiving a tailgate locking pin and defining an imperforate shield thereover, a central longitudinal slot in said head piece defining projecting fingers below the transverse slot, a latch bar pivotally secured in said longitudinal slot, a latch head on one end of said latch bar operating between said fingers for releasably locking the tailgate pin in said transverse slot, an adjustable link pivotally joining the opposite offset end of said latch bar to one arm of a bell crank, means connecting the other arm of said bell crank for actuating said control device, the pivotal connection of said link and bell crank arm lying intermediate the pivotal connection of the link and offset end of the latch bar and the pivotal support of the bell crank, respectively, being positioned above a dead center line extending between said latter pivotal connections to lock the latch head in locking position, and means for limiting the amount of travel above the dead center line of said link and bell crank arm pivotal connection.

JOHN L. SCHETKY.

REFERENCES CITED

The following references are of record in the file of this patent:

UNITED STATES PATENTS

| Number | Name | Date |
|---|---|---|
| 1,456,630 | Eaton et al. | May 29, 1923 |
| 1,499,155 | Christianson | June 24, 1924 |
| 1,587,612 | Staley | June 8, 1926 |
| 1,711,299 | Wood | Apr. 30, 1929 |
| 1,729,375 | Ellis | Sept. 24, 1929 |
| 1,828,797 | Becker | Oct. 27, 1931 |
| 1,830,389 | Ellis et al. | Nov. 3, 1931 |
| 1,686,239 | Kadel | Oct. 2, 1938 |
| 2,299,922 | Newell | Oct. 27, 1942 |